I. BAUER.
COOKING UTENSIL.
APPLICATION FILED FEB. 23, 1909.
926,163.
Patented June 29, 1909.
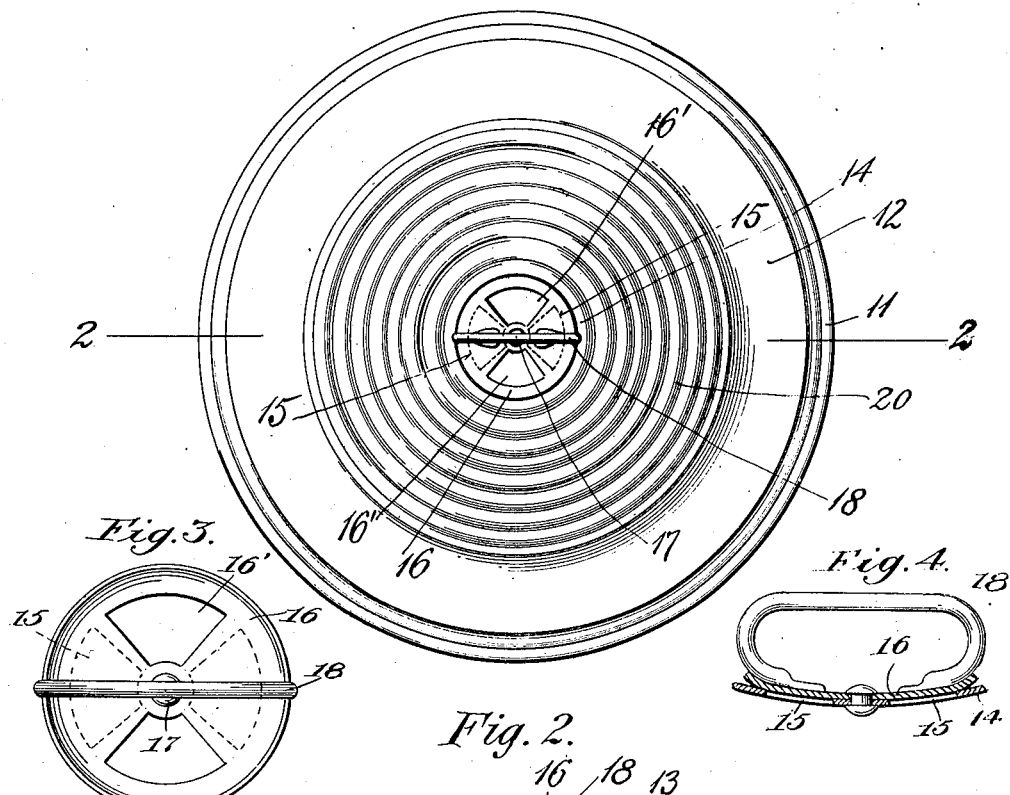
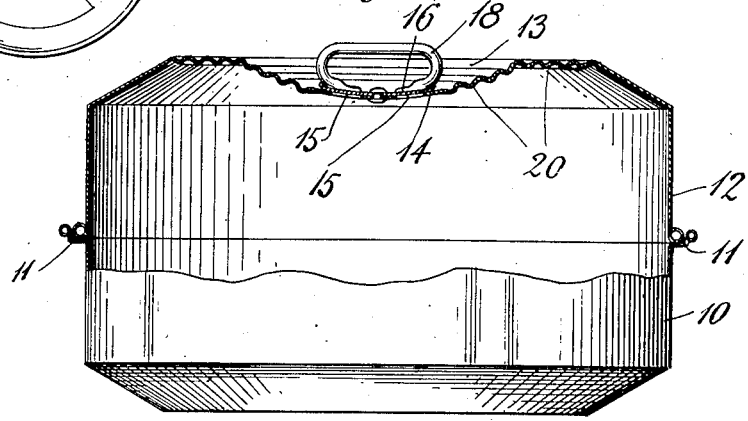
WITNESSES:
M. E. O'Neill.
A. L. Nevels.
INVENTOR.
I. Bauer,
BY Chas. F. Schmelz
ATTORNEY.

UNITED STATES PATENT OFFICE.

ISAAC BAUER, OF MIDDLETOWN, CONNECTICUT, ASSIGNOR TO THE NEW ENGLAND ENAMELING COMPANY, OF MIDDLETOWN, CONNECTICUT.

COOKING UTENSIL.

No. 926,163.          Specification of Letters Patent.          Patented June 29, 1909.

Application filed February 23, 1909. Serial No. 479,595.

*To all whom it may concern:*

Be it known that I, ISAAC BAUER, a citizen of the United States, and resident of Middletown, in the county of Middlesex and State of Connecticut, have invented certain new and useful Improvements in Cooking Utensils, of which the following is a full, clear, and exact specification.

This invention relates to cooking utensils, and more especially to that class thereof which are generally known as "roasters", and it has for one of its objects the provision of such a device, consisting of two or more sections to form an inclosed pan, and which comprises as one of its features a vent provided with a suitable valve for regulating the escape of steam generated within the roaster, as desired.

The invention has, furthermore, for its object the combination with such valve, of a handle of such size as to enable one not only to open or close the valve but, furthermore, to manipulate the pan, to which it is secured, in its entirety.

A further object of the invention resides in the particular construction of the valve or vent closure which is made of such shape as to embody great strength structurally with very little weight.

Other objects of the invention will hereinafter appear.

The invention has been clearly illustrated in the accompanying drawings, in which similar characters denote similar parts, and in which—

Figure 1 is a top view of a roaster embodying my invention, and Fig. 2 is a side view thereof partly broken away on line 2, 2 of Fig. 1. Fig. 3, is an enlarged view of the central portion of Fig. 1, and Fig. 4 represents an enlarged sectional view of the central portion of Fig. 2.

The primary object of the invention is to combine in a single piece, a valve-plate or vent-closure and also a handle whereby the roaster section to which it is attached may be manipulated. Under ordinary conditions, ventilated cooking utensils are provided with one or more small vent openings which are closed by a movable valve-plate while one or more handles are provided either at its sides or at the top for manipulating the section irrespective of the valve. Generally the vent openings are made in the cover so as to permit the steam to escape to the desired extent, the closure being of very thin and flat metal which is entirely unsuited to receive a handle for manipulating the entire section inasmuch as it would not be strong enough to support the weight. My improved roaster therefore comprises a valve-plate which, although made of thin sheet metal, is of such shape as to be very strong and offers a sufficient strength against buckling or otherwise bending when the cover is lifted by the handle attached to the disk.

In the drawings, the numeral 10 denotes the bottom pan or base of the roaster which in the present instance is preferably circular in form and which has an annular flange 11 adapted to receive the lower edge of the cover 12. The top of the cover is spherically dished as shown at 13 and its central portion 14 is provided with a pair of oppositely disposed vent openings 15 which may be opened and closed by a spherically shaped valve 16 having openings 16' adapted to register with the openings 15 to close the same when the valve-disk 16 is turned to the proper position, and any suitable means may be employed for limiting the movement of the disk in either closed or open position. The valve-disk 16 is mounted for rotation on a stud 17 secured to the cover. By virtue of this dished construction, the strength of the plate is of necessity vastly increased so that I am enabled to attach the cover manipulating strap handle 18 directly to the valve-disk at diametrically opposite points thereof, and the latter, therefore, answers both purposes, namely, that of manipulating the valve-disk and that of lifting the cover without any danger of bending or buckling the disk. I also prefer to make the cover top corrugated, as shown at 20 so that the steam generated in the bottom of the pan and subsequently condensing on the underside of the cover top, will be practically assembled in rings so that the contents of the roaster such as meat, etc., will be automatically basted by the drip resultant therefrom. Furthermore, it will be seen that by virtue of the dished central portion 13 of the cover its strength will be greatly increased so that thin metal may be used and the weight of the cover will consequently be considerably reduced.

Another advantage which is gained by the dished construction of the cover is, that the projection of the handle 18 above the upper surface of the roaster cover will be lessened so that for the same size oven this construction will afford a great deal more steam space than heretofore.

I claim:

The combination with a pan, of a cover having a downward spherically-dished top, a vent aperture disposed near the center of said dished portion, a valve plate circular in form and spherically-dished having a vent opening entirely within the confines of said plate and disposed on top of the dished cover-portion and contacting therewith, a stud for rotatably supporting the valve plate on the cover, and a strap handle secured to the valve plate at diametrically opposite points thereof for rotating said valve and manipulating the cover.

ISAAC BAUER.

Witnesses:
T. J. McDONALD,
JOHN W. LEAHY.